United States Patent [19]
Gray et al.

[11] 3,755,227
[45] Aug. 28, 1973

[54] FLAME RETARDED BLOCK COPOLYMERS AND ADDITIVE SYSTEM THEREFOR

[75] Inventors: Roy A. Gray; Donnie G. Brady, both of Bartlesville, Okla.

[73] Assignee: Phillips Petroleum Company, Bartlesville, Okla.

[22] Filed: Mar. 27, 1972

[21] Appl. No.: 238,536

[52] U.S. Cl. 260/28.5 A, 260/45.7 R, 260/45.75 R, 260/DIG. 24
[51] Int. Cl. .............................................. C08f 45/30
[58] Field of Search ................ 260/28.5 A, 28.5 R, 260/DIG. 24, 33.8 UA; 106/15 FP

[56] References Cited
UNITED STATES PATENTS

| | | | |
|---|---|---|---|
| 3,591,507 | 7/1971 | Drake | 106/15 FP |
| 2,590,211 | 3/1952 | Rugar | 106/15 FP |
| 3,403,118 | 9/1968 | Listner | 106/15 FP |
| 3,635,850 | 1/1972 | Birkner | 260/28.5 R |
| 3,660,533 | 5/1972 | Drake | 260/DIG. 24 |
| 3,576,784 | 4/1971 | Gloor | 260/28.5 A |

Primary Examiner—Morris Liebman
Assistant Examiner—P. R. Michl
Attorney—Quigg and Oberlin

[57] ABSTRACT

Flame-retardancy is imparted to ethylene-propylene block copolymers by incorporation therein as the flame-retardant system a mixture of (A) a chlorinated paraffin, (B) a brominated bis(cycloalkenyl) compound, and (C) antimony trioxide.

2 Claims, No Drawings

FLAME RETARDED BLOCK COPOLYMERS AND ADDITIVE SYSTEM THEREFOR

This invention relates to flame-retarded olefin block copolymers and flame-retardant systems therefor.

While many additive systems have been formulated for the purpose of imparting flame-retardancy to polyolefins such as polyethylene, polypropylene and polyisobutylene, such systems are not capable of use in all such polymers. It has been found that in many instances systems must be formulated such that they will produce the desired flame-resistance in the polymer composition but at the same time avoid producing an adverse effect on the physical properties of the polymer which would prevent its use for its originally intended purpose. Thus, block copolymers of ethylene and propylene have been difficult to render flame-resistant in the past using systems known to the art without adversely affecting the physical properties of the polymer. This difficulty is believed to be due to the effect of the high loading required in additive systems heretofore available in order to achieve any degree of flame-resistance.

Accordingly, it is an object of the present invention to provide a novel flame-retarded ethylene-propylene copolymer composition.

Another object of the invention is to provide a unique and synergistically active flame-retardant additive system for olefin polymers.

Other aspects, objects and the several advantages of the invention will be readily apparent to those skilled in the art from a study of this disclosure and the appended claims.

In accordance with the present invention, we have discovered that block copolymers of ethylene and propylene can be satisfactorily rendered flame-retarded without adverse effect on the physical properties of the copolymer composition if there is employed as the flame-retardant additive system a mixture of (A) a chlorinated paraffin, (B) a brominated bis(cycloalkenyl) compound, and (C) antimony trioxide.

In addition, we have further discovered that the additive system of the invention is of particular advantage in rendering olefin polymers flame-resistant due to the synergistic activity displayed by the system at low levels of addition to the polymer composition.

The block polymers suitable in the practice of the invention include those in which the major block comprises crystalline polypropylene and the minor block comprises linear polyethylene. The presently preferred block polymer consists of a major segment comprising about 70 to 95 weight percent crystalline polypropylene and a minor segment comprising about 30 to 5 weight percent of a copolymer of ethylene and propylene. The structure of the minor segment is not clearly understood but is thought to consist primarily of relatively long random copolymer blocks interspersed randomly with short polyethylene sequences. Studies have shown that the amount of ethylene contained in the minor block of the polymer ranges from about 40 to 80 weight percent, depending upon polymerization conditions. The propylene content of the total polymer thus ranges from about 76 to 98 weight percent and ethylene content ranges from about 24 to 2 weight percent.

The brominated bis(cycloalkenyl) components of the inventive additive system are formed by the bromination of a bis(cycloalkenly) compound and have the general formula

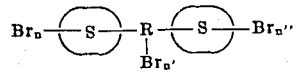

in which the circles represent cycloalkyl groups having 5 to 8 carbon atoms, R is a saturated acyclic hydrocarbon radical having 1 to 4 carbon atoms, and the values of $n$, $n'$ and $n''$ are selected such that the total bromine content of the compound is in the range of 30 to 90 weight percent. A bromine content of 65 to 85 weight percent is preferred. Examples of compounds that can be used are:

bis(2,5-dibromocyclopentyl)dibromomethane
1,2-bis(3,4-dibromocyclohexyl)-1,2-dibromoethane
2,3-bis(2,3,4,5,6-pentabromocyclohexyl)-1,4-dibromobutane
1,4-bis(2,3,4,5,6,7,8-heptabromromocyclooctyl)-1,2,3,4-tetrabromobutane  1-(2,5-dibromocyclopentyl)-2-(3,4-dibromocyclohexyl)-3-bromopropane
1,3-bis(3,4,5-tribromocyclohexyl)-2-dibromomethylpropane and the like.

Chlorinated paraffins suitable for use in the present invention are those having a molecular weight in the range of 300 to 1,500 and which contain from 40 to 80 weight percent chlorine. Presently preferred chlorinated paraffins contain 60 to 75 weight percent chlorine and have a molecular weight in the range of 350 to 1,000. Such compounds are commercially available and are produced by the chlorination of selected paraffin wax and liquid paraffinic fractions.

In utilizing the additive systems of this invention, there is no definite upper limit for the amount of total additive to be employed, so long as the properties of the polymer are not adversely affected. Ordinarily, the additives are used at the lowest level which will provide the desired degree of flame-retardancy. The following ranges generally are employed:

|  | Broad* | Preferred* |
|---|---|---|
| (A) Organo bromine compound | 0.2 to 15 | 0.6 to 7.5 |
| (B) Chlorinated paraffin | 1 to 27 | 3 to 13.5 |

* Parts per hundred parts (php) of block polymer.

The halogenated components (A) and (B) should be present in an amount in admixture with the polymer such that the total halogen in the formulation is at least 0.5 weight percent.

Antimony trioxide, which consitutes component (C) of the additive system of this invention, is used in amounts in the range of 0.1 to 15 parts per hundred parts of polymer. In one presently preferred embodiment of the invention, from 1 to 7.5 parts antimony trioxide per hundred parts of polymer is employed, in combination with the additive system formed by the admixing of (A) and (B) as defined above.

The production of the flame-resistant compositions can be carried out in various manners. For example, intimate mixtures of block polymer and flame-retardant additive according to this invention can be prepared by mixing the block polymer and the additive system at an elevated temperature in an extrusion press or a kneader. The chlorinated and brominated components also can be dissolved in a common solvent, the solution admixed with the polymer, and the solvent subsequently removed and the antimony trioxide then added.

It is to be understood that the compositions of this invention also can have incorporated therein the usual fillers, dyes, pigments, plasticizers, antistatic agents, antioxidants, stabilizing agents, and the like, if desired. Such components are well known in the art.

The flame-retarded block copolymer compositions of this invention are useful for a variety of purposes, such as in sheets, fibers, hollow articles, automotive components, furniture, and other molded objects. The usual processing methods for thermoplastics, such as injection molding, can be employed in fabricating the flame-resistant material compounded in accordance with this invention.

The following example will further illustrate the instant invention, although it is not intended that the invention be limited thereto.

EXAMPLE

A series of formulations were prepared by admixing a block copolymer of ethylene and propylene '1)
'1) Physical properties of the propylene/ethylene copolymers were:

| IZOD impact strength ft-lb/in. | tensile strength psi | flexural modulus psi $\times 10^{-3}$ | elongation % |
|---|---|---|---|
| 4.27 | 2950 | 170 | 158 | below, of a chlorinated paraffin containing from 68 to 72 weight percent chlorine and having an approximate molecular weight of 1000 ("Cereclor" 70, manufactured by I.C.I. (Organics) Inc., Providence, R.I.); 1,2-bis(3,4-dibromocyclohexyl) -1,2-dibromoethane ($Br_6BCE$); and antimony trioxide.

The formulations were dry blended on a two-roll mill at a temperature of 320°–360° F. The resulting compositions were then compression molded at 325°–375° F. into sheets ⅛ inch thick, from which samples were cut. The burning characteristics of the samples were then determined by the Limiting Oxygen Index (L.O.I.) method (C.P. Fenimore and F. J. Martin, *Modern Plastics* 43, 141 (Nov. 1666). The L.O.I. is the minimal volume fraction of oxygen required in an oxygen/nitgogen atmosphere to sustain burning of a plastic test sample. The following results were obtained.

LIMITING OXYGEN INDEX (L.O.I.)

| Sample No. | $Sb_2O_3$ p.h.p. | Chlorinated paraffin/ $Br_6BCE$ p.h.p. | 100/0 | 90/10 | 85/15 | 75/25 | 50/50 | 25/75 | 0/100 |
|---|---|---|---|---|---|---|---|---|---|
| 1 | 3 | 6 | 0.229 | 0.236 | 0.242 | 0.242 | 0.245 | 0.242 | 0.218 |
| 2 | 4.5 | 9 | 0.231 | 0.236 | 0.250 | 0.245 | 0.248 | 0.248 | 0.239 |
| 3 | 6 | 12 | 0.245 | 0.248 | 0.253 | 0.256 | 0.259 | 0.256 | 0.245 |

The above data clearly demonstrate that at all additive levels tested using the combination comprising organo bromine compound, chlorinated paraffin and antimony trioxide, a definite advantage was achieved over using either the organo bromine compound or chlorinated paraffin compound alone.

Reasonable modifications and variations can be made, or followed, in view of the foregoing specification, without departing from the spirit or scope thereof.

We claim:

1. A flame-resistant polymeric composition consisting essentially of a block polymer which consists of about 70 to 90 weight percent crystalline polypropylene and about 30 to 5 weight percent of a copolymer of ethylene and propylene, and wherein the propylene content of the total polymer is in the range of about 76 to 98 weight percent and the ethylene content of the total polymer is in the range of 24 to 2 weight percent, having admixed therein a flame-retarding amount of a flame-retardant system consisting of (A) a brominated compound of the formula

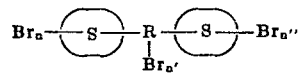

in which the circles represent cycloalkyl groups having 5 to 8 carbon atoms in the ring, R is a saturated acyclic hydrocarbon radical having 1 to 4 carbon atoms, and the values of $n$, $n'$ and $n''$ are selected such that the total bromine content of the compound is in the range of 30 to 90 weight percent; (B) a chlorinated paraffin having a chlorine content in the range of 40 to 80 weight percent and a molecular weight in the range of 300 to 1,500; and (C) antimony trioxide, and wherein there is provided from 3 to 6 php of (C) and from 6 to 12 php of a mixture of (A) and (B) and wherein the weight ratio of (B) to (A) is in the range of 90:10 to 25:75.

2. A composition according to claim 1 wherein compound (A) is 1,2-bis(3,4-dibromocyclohexyl)-1,2-dibromoethane and compound (B) is a chlorinated paraffin having 68 to 72 weight percent chlorine an approximate molecular weight of 1000.

* * * * *